(12) United States Patent
Sakai et al.

(10) Patent No.: US 7,584,317 B2
(45) Date of Patent: Sep. 1, 2009

(54) PROTOCOL CONVERSION CIRCUIT

(75) Inventors: Yuki Sakai, Kawasaki (JP); Katsuhiro Yoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/889,484

(22) Filed: Aug. 14, 2007

(65) Prior Publication Data

US 2008/0040521 A1    Feb. 14, 2008

Related U.S. Application Data

(63) Continuation of application No. PCT/JP2005/002283, filed on Feb. 15, 2005.

(51) Int. Cl.
*G06F 13/36* (2006.01)
*G06F 15/16* (2006.01)

(52) U.S. Cl. .......... 710/315; 713/400; 713/401; 714/814; 714/815; 709/230; 455/422.1

(58) Field of Classification Search .......... 710/315
See application file for complete search history.

(56) References Cited

U.S. PATENT DOCUMENTS

| 6,871,244 | B1 * | 3/2005 | Cahill et al. | 710/62 |
| 6,914,950 | B1 * | 7/2005 | Luneau | 375/347 |
| 6,996,659 | B2 * | 2/2006 | Lupien et al. | 710/315 |
| 7,177,590 | B1 * | 2/2007 | Stevens | 455/3.04 |
| 7,203,488 | B2 * | 4/2007 | Luneau | 455/422.1 |
| 7,272,413 | B2 * | 9/2007 | Yu | 455/552.1 |
| 7,380,151 | B1 * | 5/2008 | Bahai | 713/500 |
| 7,437,158 | B2 * | 10/2008 | Russell | 455/435.2 |
| 2003/0158954 | A1 * | 8/2003 | Williams | 709/230 |
| 2006/0045212 | A1 * | 3/2006 | Ishii et al. | 375/340 |

FOREIGN PATENT DOCUMENTS

| JP | 03-085845 A | 4/1991 |
| JP | 06-332847 A | 12/1994 |
| JP | 2002-185557 A | 6/2002 |

OTHER PUBLICATIONS

Wipro Technologies, "Software-Defined Radio" White Paper: Aug. 2002, 10 pages.*

* cited by examiner

*Primary Examiner*—Paul R Myers
*Assistant Examiner*—Brian T Misiura
(74) *Attorney, Agent, or Firm*—Fujitsu Patent Center

(57) ABSTRACT

A protocol conversion circuit performing a protocol conversion between a preceding stage circuit and a succeeding stage circuit includes a data storing unit storing input data from the preceding stage circuit, an output enable signal generating unit generating an output enable signal outputting data stored in the data storing unit to the succeeding stage circuit by using one or more parameters for the protocol conversion which are externally fed and can take a different value each time interval externally specified, and an address specifying unit specifying an address for read of an output data for the data storing unit based on the output enable signal.

12 Claims, 23 Drawing Sheets

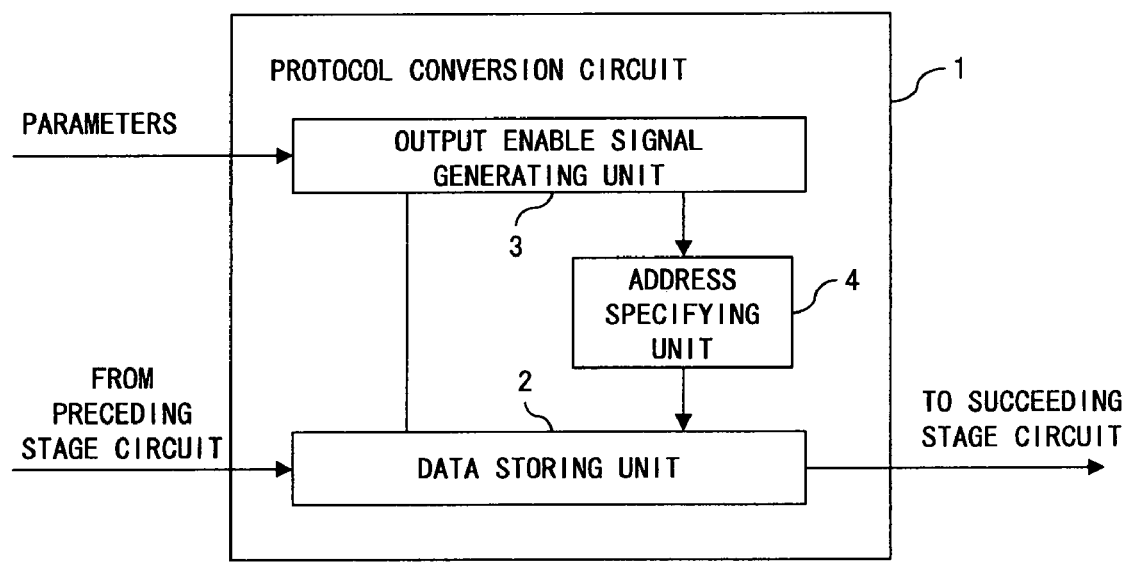
F I G. 4

| M | N | O | P | Q | R | T |
|---|---|---|---|---|---|---|
| 5 | 11 | 176 | 2 | 15 | 0 | 0 |

FIG. 10

PROTOCOL CONVERSION CIRCUIT

CROSS REFERENCE TO RELATED APPLICATION

This application is a continuation of international PCT application No. PCT/JP2005/002283 filed on Feb. 15, 2005, the entire contents of which are incorporated herein by reference.

BACKGROUND

1. Field

The embodiments relate to a communication protocol conversion in a communication circuit, and a conversion method for a bus protocol at the time of a data transfer using a bus.

2. Description of the Related Art

In recent years, a software wireless device (SDR: Software Defined Radio) has been put into practical use. This software wireless device is a wireless device that can absorb differences in communication methods by dynamically changing a circuit configuration with the use of a reconfigurable logic such as a field programmable gate array (FPGA) in order to support, for example, communication methods of various types of cellular phones with one device.

FIG. 1 is a block diagram showing the configuration of such a software wireless device. In this device, digital data accessed by an MAC (Media Access Controller) 105 within a digital BB (Base Band) unit 100 is encoded and modulated by a physical layer processing unit (PHY) 106, D/A converted by an analog BB unit 101, and transmitted from an antenna 103 via an analog RF (Radio Frequency) unit 102, at the time of transmission. A wireless signal received by the antenna 103 is A/D converted by the analog BB unit 101 via the analog RF unit 102, synchronized, demodulated, error-corrected, etc. by the physical layer processing unit 106, and transferred to media on a receiving side by the media access controller 105.

In such a software wireless device, especially, a circuit that constitutes the physical layer processing unit 106 within the digital BB unit 100 is dynamically changed by using a reconfigurable circuit in correspondence with various types of communications methods, whereby one wireless device can support, for example, methods of various types of cellular phones.

FIG. 2 is a schematic explaining a network (bus) connection for various types of digital processes within the physical layer processing unit 106 using this reconfigurable circuit. For example, data from a circuit on the left side not shown is input to any of reconfigurable circuits $109_a$ to $109_d$ via any of selectors $108_a$ to $108_d$ depending on need. For example, the reconfigurable circuit $109_a$ is a circuit that can support a plurality of modulation methods, and its configuration can be dynamically changed in correspondence with a communication method such as BPSK (Binary Phase Shift Keying), QPSK (Quadrature Phase Shift Keying), etc. Additionally, for example, the reconfigurable circuit $109_b$ is, for example, a circuit for an error correction, and its configuration can be dynamically changed in correspondence with various methods of error corrections. Communication data is digitally processed by some of these reconfigurable circuits depending on need, and passed to the analog BB unit 101, for example, as transmission data.

FIG. 3 is a schematic explaining a conventional example of a protocol conversion method in such a software wireless device, etc. In this figure, if data is transferred from a preceding stage circuit 111, namely, the circuit not shown on the left side of a network in the description of FIG. 2 to a succeeding stage circuit 112, for example, the reconfigurable circuit $109_a$, a protocol conversion circuit that copes with a communication protocol dynamically changed in accordance with the succeeding stage circuit 112, namely, the reconfigurable circuit $109_a$ is required. In FIG. 3, 3 protocol conversion circuits $115_a$ to $115_c$ correspond to this required protocol conversion circuit. Conventionally, it is necessary to feed any of the outputs of the 3 protocol conversion circuits $115_a$ to $115_c$ to the succeeding stage circuit 112 via a selector 114 in accordance with a dynamic change in a protocol on the side of the succeeding stage circuit 112.

Such a conventional technique has problems such that a plurality of bus protocol conversion circuits are required in correspondence with a change in a circuit configuration corresponding to the communication method of the succeeding stage circuit, and information required for a protocol conversion must be obtained from the side of the succeeding stage circuit 112. For example, information indicating that a longer time is required to process data on the side of the succeeding stage circuit 112 than that in the preceding stage circuit 111 may be required for the protocol conversion. As a result, the above-mentioned conventional technique also has a problem such that a control for obtaining the information becomes complicated when such information dynamically changes.

As a conventional technique related to such a protocol conversion circuit, the following document exists. Patent Document 1: Japanese Published Unexamined Patent Application No. H6-332847 "Bus Conversion And Connection Circuit"

Aforementioned document discloses a device that connects 2 buses in different forms, and also discloses a technique for transmitting, from the side of a preceding stage circuit to a conversion circuit, data having a format where parameters for a conversion circuit, which correspond to the protocol of the side of the succeeding stage circuit, are attached to the header of a frame.

SUMMARY

The present embodiment provides that a protocol conversion circuit performing a protocol conversion between a preceding stage circuit and a succeeding stage circuit, including a data storing unit storing input data from the preceding stage circuit, an output enable signal generating unit generating an output enable signal for outputting data stored in the data storing unit to the succeeding stage circuit by using one or more parameters for the protocol conversion which are externally fed and can take a different value each time interval externally specified, and an address specifying unit specifying an address for read of an output data for the data storing unit based on the output enable signal.

BRIEF DESCRIPTION OF THE DRAWINGS

FIG. 4 is a block diagram showing the principle configuration of a protocol conversion circuit according to the embodiment;

FIG. 10 is a schematic showing specific examples of the parameters;

DESCRIPTION OF THE PREFERRED EMBODIMENTS

Figure 1:
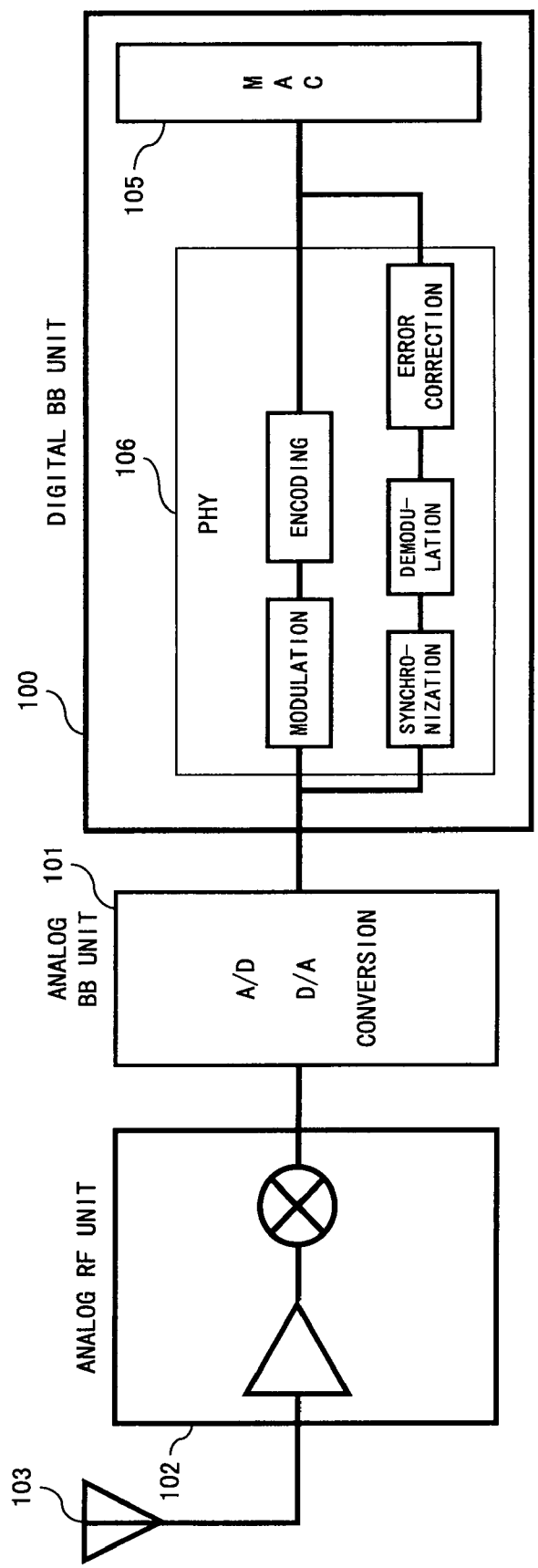
FIG. 1 is a block diagram showing the configuration of a software wireless device.

FIG. 4 is a block diagram showing the principle configuration of a protocol conversion circuit according to the embodiment. This figure shows the principle configuration of the protocol conversion circuit for performing a conversion for a protocol, such as a communication protocol, and a bus protocol, between a preceding stage circuit and a succeeding stage circuit. The protocol conversion circuit 1 comprises a data storing unit 2, an output enable signal generating unit 3, and an address specifying unit 4.

The data storing unit 2 stores data input from the preceding stage circuit, and is, for example, a memory. The output enable signal generating unit 3 generates an output enable signal for outputting data stored in the data storing unit 2 to the succeeding stage circuit by using one or more parameters for the protocol conversion which are externally fed and can take a value different for each externally specified time interval. The address specifying unit 4 feeds the address of an output data read to the data storing unit 2 based on the output enable signal.

In the embodiment, the protocol conversion circuit 1 is comprised by a software wireless device, and parameters for a protocol conversion can be fed from a central processing unit which controls the whole of the software wireless device, or it also can be fed from the side of the succeeding stage circuit within the software wireless device. Additionally, the above described externally specified time interval can be one of the protocol conversion parameters.

The protocol conversion circuit according to the embodiment can further comprise a start signal generating unit for outputting a start signal to the output enable signal generating unit at a time point when initial input data is stored in the memory, which configures the data storing unit 2, for the above described specified time interval, and the output enable generating unit 3 can generate an output enable signal which is delayed by a predetermined number of clocks specified with one of the above described parameters from the input time point of the start signal.

Or, the protocol conversion circuit can further comprise a parameter register for storing parameters for a protocol conversion in correspondence with a mode of the protocol conversion, and the output enable signal generating unit can generate an output enable signal based on the contents of the parameter register in correspondence with a change in an externally fed protocol conversion mode signal.

Additionally, the protocol conversion circuit can further comprise a data passing-through unit for outputting data input from the preceding stage circuit unchanged to the succeeding stage circuit if one of the parameters for the protocol conversion is a parameter which indicates whether or not to perform a protocol conversion, and if the parameter indicates not to perform the protocol conversion.

Or, a 0 (zero) data inserting unit for inserting "0" as data between pieces of data output from the data storing unit 2 can be comprised in the succeeding stage of the protocol conversion circuit 1 according to the embodiment.

In the embodiment, a protocol conversion circuit, which performs a protocol conversion between 2 preceding stage circuits and 2 succeeding stage circuits respectively corresponding to the 2 preceding stage circuits, comprises 2 data storing units, a start signal generating unit, and an output enable signal generating unit.

The 2 data storing units respectively store input data from the 2 preceding stage circuits. The start signal generating unit receives a start signal output from each of the data storing units at a time point when initial data is stored respectively in the two data storing units for each time interval which is externally specified for each of the 2 data storing units, and outputs a real start signal upon receipt of the start signals from both of the 2 data storing units. The output enable signal generating unit generates a shared output enable signal which is an output enable signal for outputting data stored in the data storing units to the succeeding stage circuits and which is delayed by a predetermined number of clocks, the predetermined number being specified by one of the above-mentioned parameters for a protocol conversion, from the input time point of the real start signal. The shared output enable signal is generated by using the parameters for a protocol conversion which are externally fed and can take a value different for each specified time interval described above, and fed to each of the data storing units.

Additionally, the protocol conversion circuit, which similarly performs a protocol conversion between 2 preceding stage circuits and 2 succeeding stage circuits corresponding to the 2 preceding stage circuits, comprises 2 data storing units, a start signal generating unit, and 2 output enable signal generating units for generating normally different output enable signals, which are output enable signals similar to the above described ones and delayed by a predetermined number of clocks, the predetermined number being indicated by one of parameters, from the input time point of a real start signal, and for feeding the generated output enable signals respectively to the data storing units.

Figure 5:
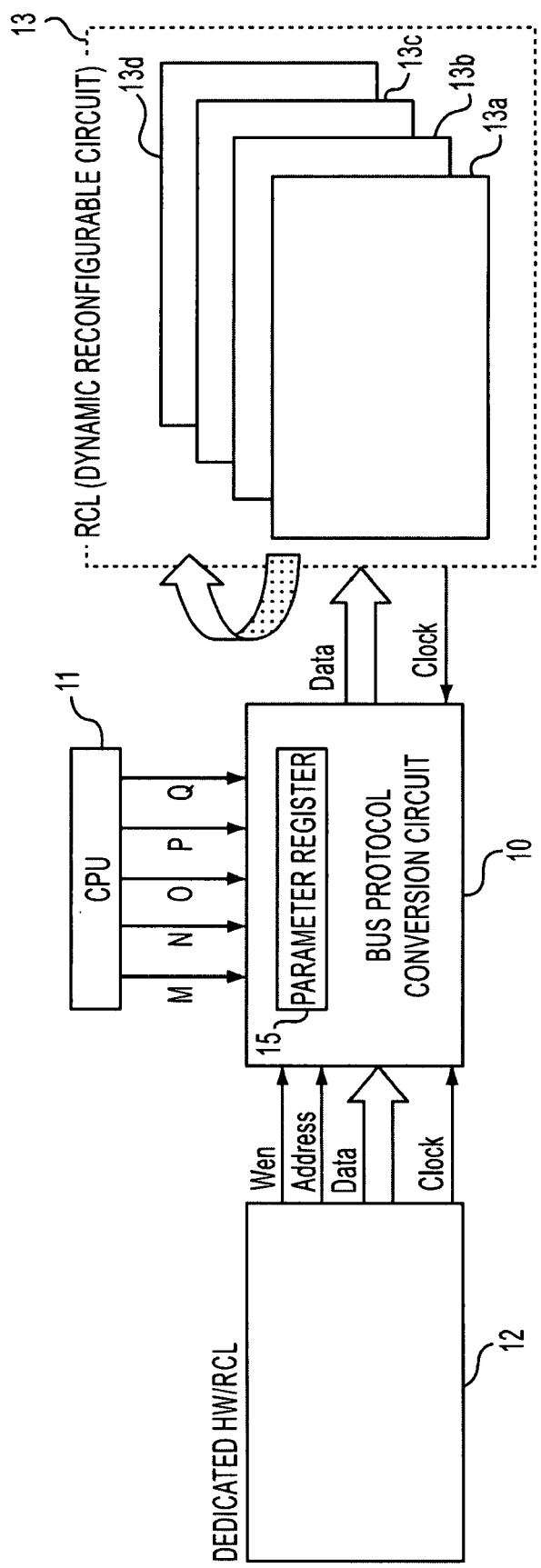
FIG. 5 is a schematic explaining the basics of the bus protocol conversion method (No. 1)
Figure 6:
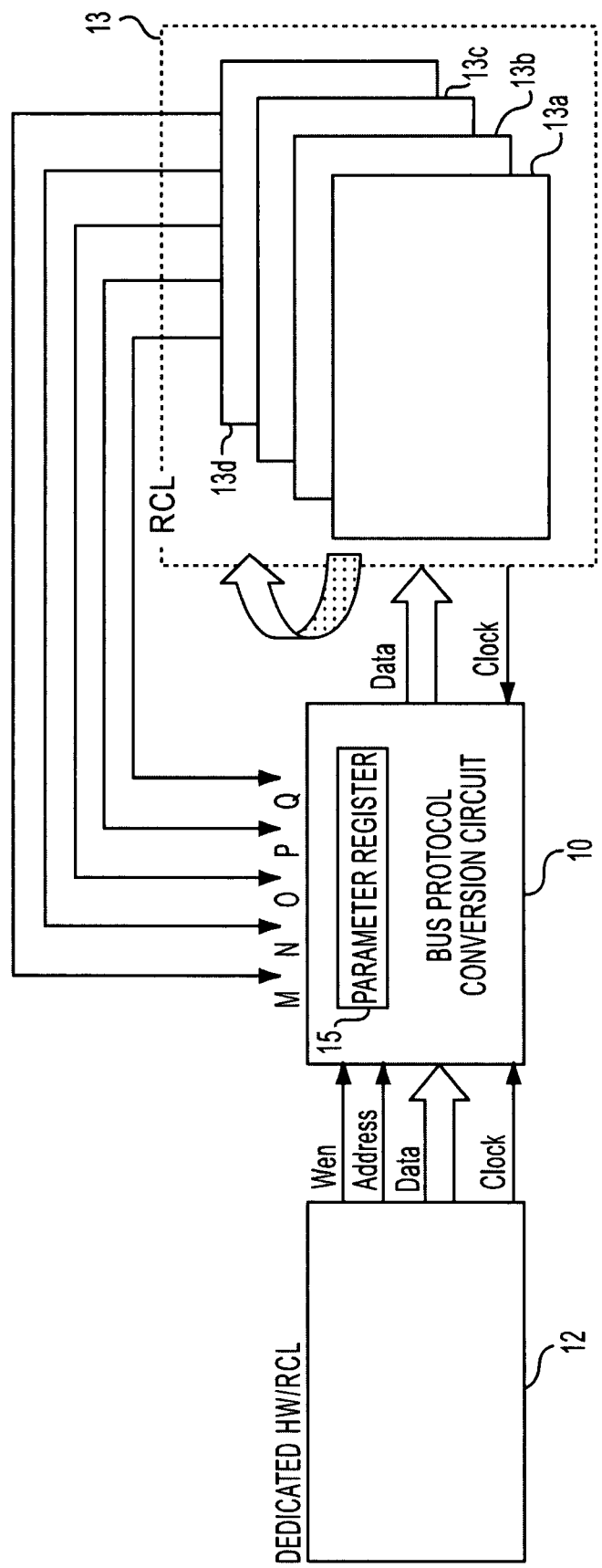
FIG. 6 is a schematic explaining the basics of the bus protocol conversion method (No. 2)

Next, the preferred embodiment according to the embodiment is further described in detail. FIGS. 5 and 6 are schematics explaining the whole of a bus protocol (or communication protocol) conversion method according to preferred embodiments of the embodiment. In this preferred embodiment, the conversion circuit which performs a bus protocol conversion performs a protocol conversion between the preceding stage circuit and the succeeding stage circuit by using externally fed parameters for the protocol conversion.

In FIG. 5, the bus protocol conversion circuit 10 performs the protocol conversion for data fed from dedicated hardware or a dedicated RCL (ReConfigurable Logic, namely, dynamic reconfigurable circuit) 12 as the preceding stage circuit by using, for example, 5 parameters M, N, O, P, and Q fed from a CPU 11 which controls the whole of the software wireless device described with reference to FIG. 1, and to feed the converted data to an RCL 13 as the succeeding stage circuit. The RCL 13 in the succeeding stage is assumed to take, for example, any of circuit forms $13_a$, $13_b$, $13_c$, and $13_d$ as a result of dynamic reconfiguration, and a clock signal is fed from the RCL in a circuit form adopted at each time point to the bus protocol conversion circuit 10. Additionally, a write enable signal (Wen) to the memory, and a write address to the memory are fed from the dedicated HW (hardware)/RCL 12 as the preceding stage circuit to the conversion circuit 10 in addition to the data and the clock. The 4 circuits RCL $13_a$ to $13_d$ may be made to originally exist within the RCL 13 in the succeeding stage, and the respective circuits may be made dynamically reconfigurable. Furthermore, the parameters for the protocol conversion fed from the CPU 11 are assumed to be stored in the parameter register 15.

In FIG. 6, the 5 parameters for the bus protocol conversion are fed not from the CPU 11 but from the side of the RCL 13 as the succeeding stage circuit, and the bus protocol conversion is performed. As described above, the side of the dedicated HW/RCL 12 as the preceding stage circuit cannot normally know the bus protocol adopted on the side of the RCL 13 as the succeeding stage circuit. However, this bus protocol is notified from the side of the RCL 13 to the bus protocol conversion circuit 10 and the notified content is stored in the parameter register 15, whereby the conversion by the bus protocol conversion circuit 10 can be performed. Here, the data amount of the parameters for the conversion is small, and it is unnecessary to store the entire data of 1 frame including the parameters for the conversion as in Patent Document 1 as a conventional technique.

Figure 7:
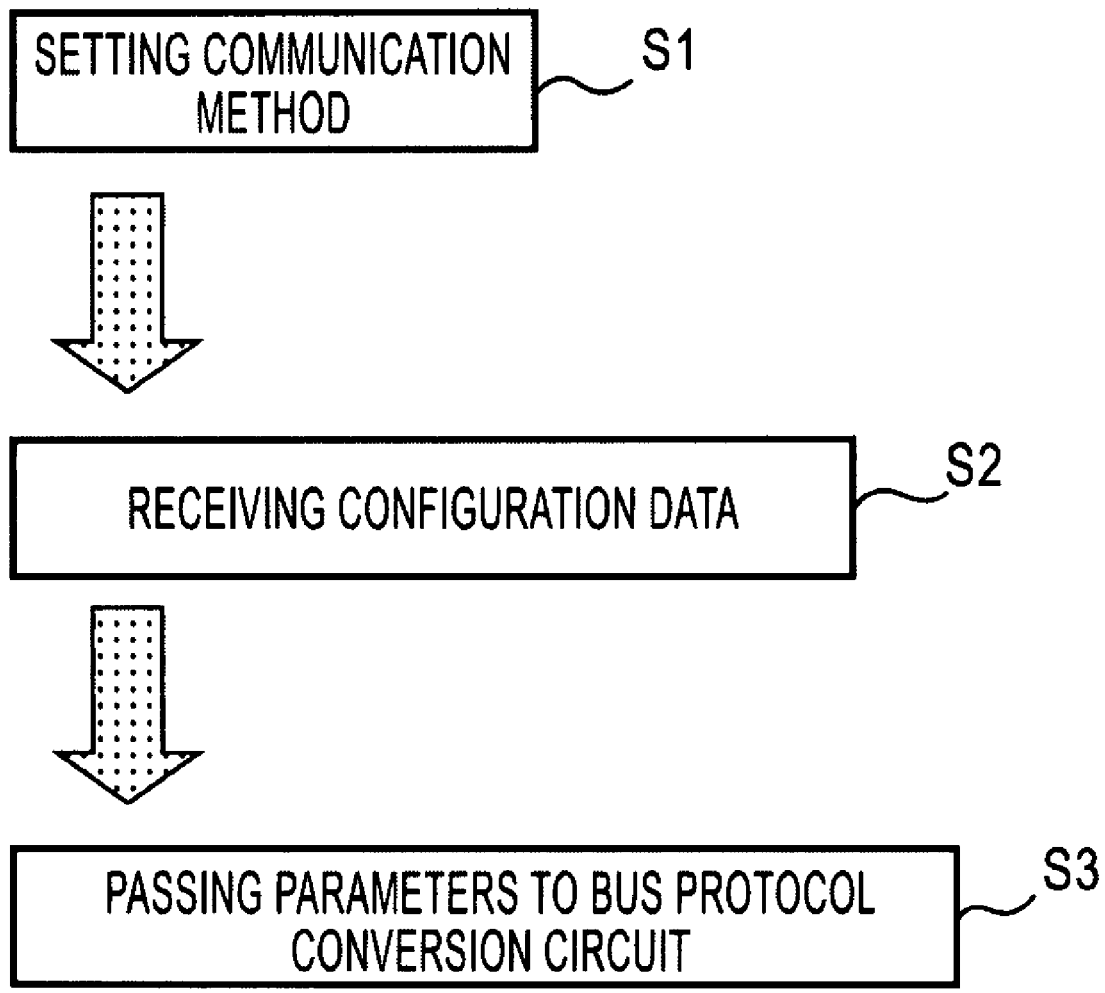
FIG. 7 is the fundamental flowchart of a bus protocol conversion control process executed by a CPU.

In FIG. 6, the 5 parameters for the bus protocol conversion are assumed to be fed from the side of the RCL 13 as the succeeding stage circuit. However, the preferred embodiments according to the embodiment are explained by assuming that these parameters are fed from the CPU 11 as described with reference to FIG. 5 in the following description. FIG. 7 is a flowchart showing the entire process executed by the CPU 11 in such a case. Once the process is started in this figure, a communication method is initially set in step S1. In step S2, configuration data indicating, for example, the arrangement of circuits is received. In step S3, conversion parameters are passed to the bus protocol conversion circuit, and the process is terminated. As far as the communication method and the configuration data are not switched, the CPU 11 does not transmit a control signal to the bus protocol conversion circuit. Details of the parameters for the bus protocol conversion described with reference to FIG. 5 are explained in a first embodiment to be described next.

Figure 8:
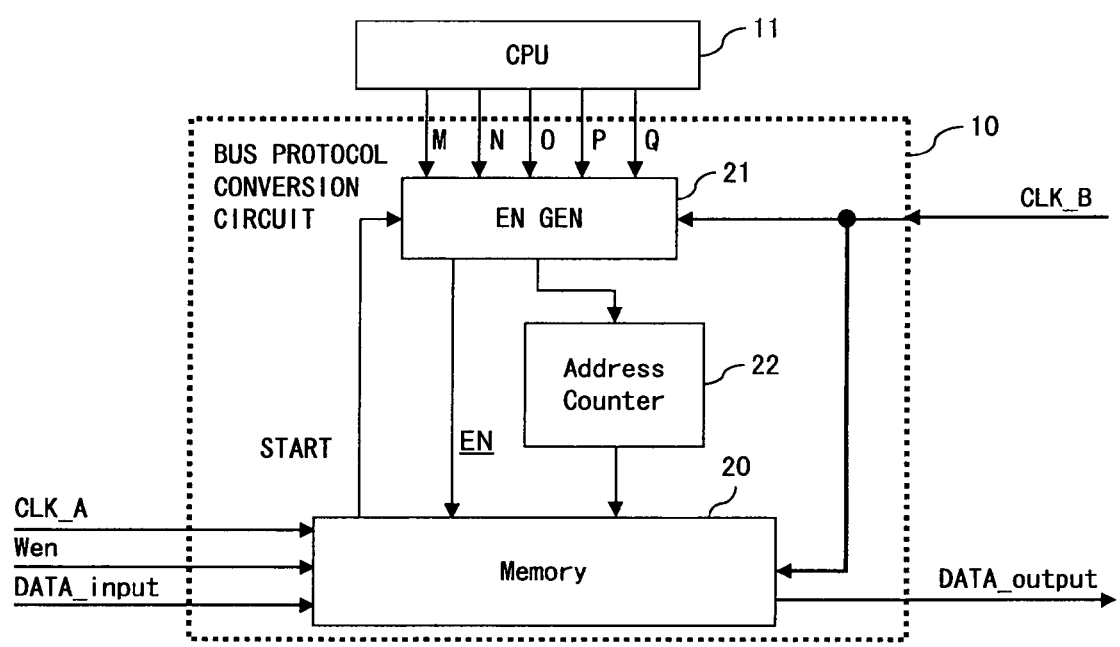
FIG. 8 is a block diagram showing a configuration of a bus protocol conversion circuit in a first embodiment.

Operations of the bus protocol conversion circuit in this preferred embodiment are described with reference to FIGS. 8 to 12 as a first embodiment. FIG. 8 is a block diagram showing the configuration of the bus protocol conversion circuit 10. In this figure, the bus protocol conversion circuit 10 comprises a memory 20, an EN generator 21, and an address counter 22. The memory 20 stores input data in correspondence with an input such as a clock signal, a write enable signal, input data, etc. from the preceding stage circuit, which corresponds to the dedicated HW/RCL 12 in FIG. 5. The EN generator 21 generates an output enable signal EN intended to output data from the memory 20 to the succeeding stage circuit, which corresponds to the RCL 13 in FIG. 5, by using the 5 parameters fed from the CPU 11. The address counter 22 feeds an address for a data read from the memory 20 in correspondence with the output of the EN generator 21. Here, the EN generator 21 generates an EN signal by using a clock signal CLK_B fed from the side of the succeeding stage circuit in correspondence with a start signal fed from the memory 20.

Figure 9:
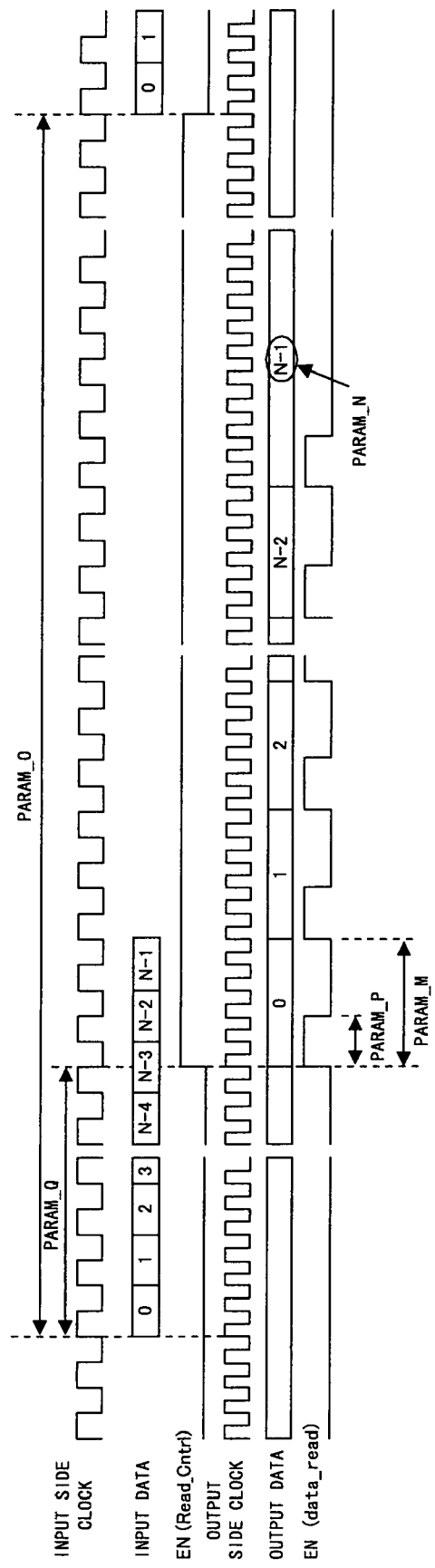
FIG. 9 is a schematic explaining parameters for a bus protocol conversion.

FIG. 9 is an operational time chart for explaining the 5 parameters M, N, O, P, and Q, which are fed from the CPU 11 in FIG. 8. The parameter O indicates the length of a data frame as the shortest time to which one protocol conversion method, namely, a mode to be described later is applied. That is, the parameter O indicates the number of cycles of the data frame. This preferred embodiment assumes that such number of cycles indicates the number of cycles of an output side clock, namely, CLK_B in FIG. 8 in all cases. Here, in order to explain this preferred embodiment, the data frame is intended to be a concept similar to a sub-frame. A large number of sub-frames can be included in one communication frame.

Next, the parameter Q indicates, similarly with the number of cycles of the output side clock, a time required from a time point when initial data within 1 data frame is input from the preceding stage circuit to the memory 20 and basically written to an address 0 of the memory 20 until a time point when the data within the memory 20 starts to be output to the succeeding stage circuit. As will be described later, the start signal is assumed to be fed from the memory 20 to the EN generator 21 at the time point when the initial data is written to the memory 20.

Here, the EN signal is assumed to include 2 signals such as a signal for read control, and a signal for data read. The EN signal for read control is a signal which becomes "H" from a time point when the number of output side clocks specified with the parameter Q elapses until the end of 1 data frame. The data read signal indicates, during the period where the EN signal for read control is "H", the cycle of data output to output data actually, and the valid duration of the data within that cycle.

Namely, the parameter M indicates the cycle of output of one piece of data in the EN signal for data read, and the parameter P indicates the valid duration of data within that cycle. Then, pieces of data, the number of pieces being specified with the parameter N, here, pieces of data with piece numbers from 0 to N−1 are output to the succeeding stage circuit in accordance with the EN signal for data read in the period during which the EN signal for read control is "H".

Figure 10:
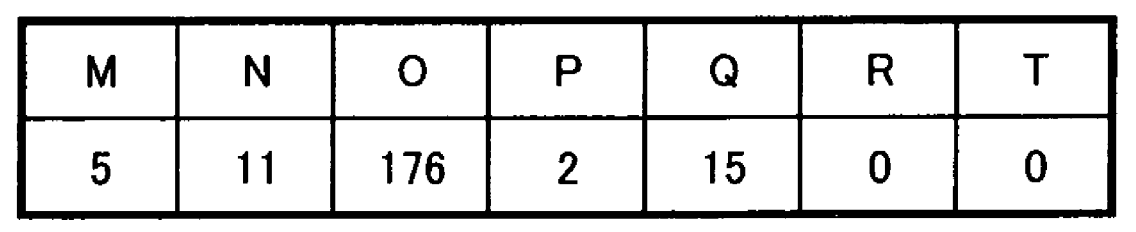
Figure 11:
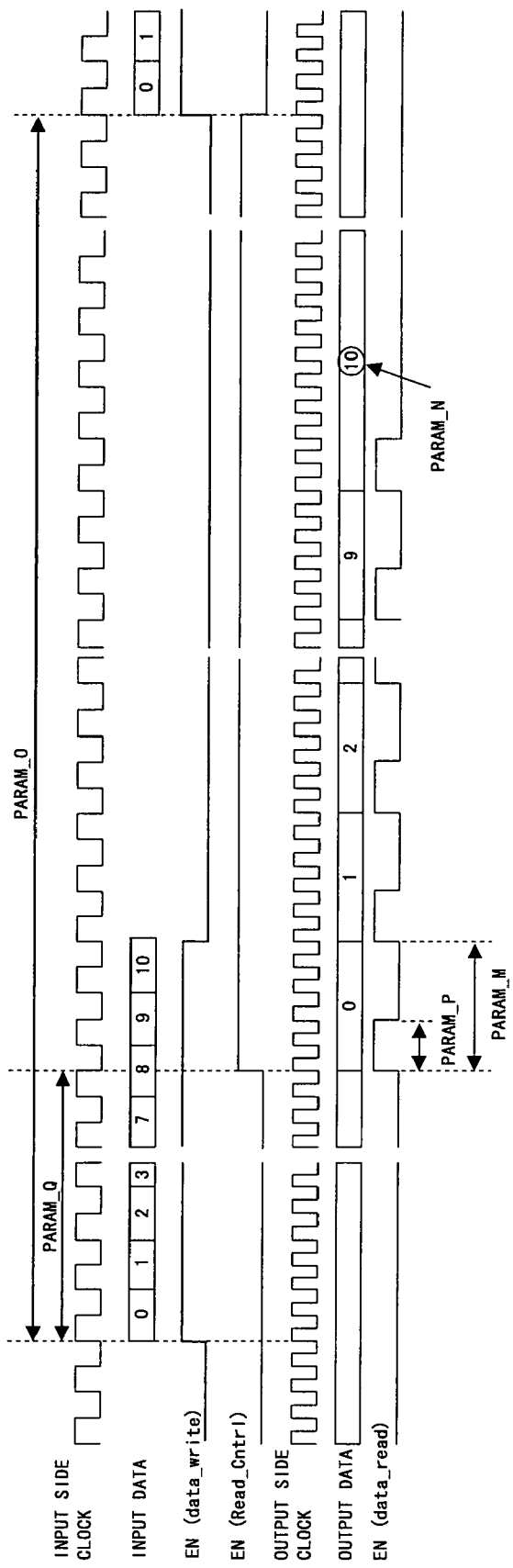
FIG. 11 is a time chart of a specific example of a bus protocol conversion operation.

FIGS. 10 and 11 exemplify parameters fed to the bus protocol conversion circuit, and an operational time chart. The time chart in a case where the values of the parameters M, N, O, P, and Q are 5, 11, 176, 2, and 15 respectively as shown in FIG. 10 is depicted in FIG. 11. As described above, all the numbers of cycles of these parameters are indicated by using the number of cycles of the output side clock. R and T among these parameters will be described later. Additionally, in FIG. 11, also a data write signal, which indicates the period of a data write to the memory, is output as an EN signal.

Figure 12:
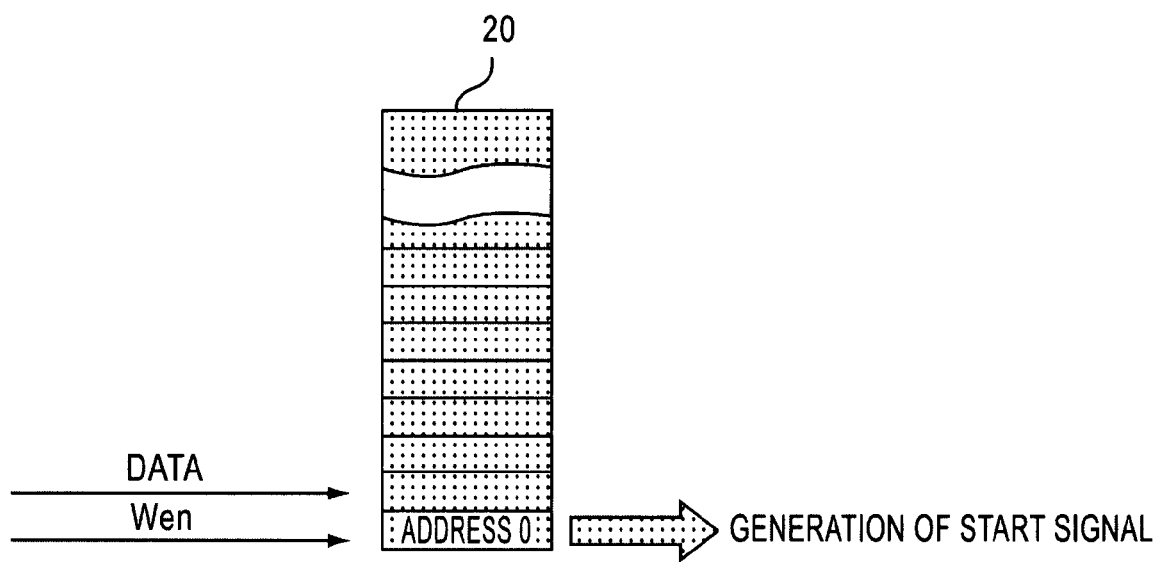
FIG. 12 is a schematic explaining a start signal generation method in the circuit of FIG. 8.

FIG. 12 is a schematic explaining a start signal generation method in the bus protocol conversion circuit of FIG. 8. The start signal is generated when triggered at a time point when data is written to the address 0 of the memory 20 such as a dual port RAM (DPRAM), and this start signal is fed to the EN generator 21, thereby specifying data output start timing specified with the parameter Q.

As described above, for example, the parameters for the protocol conversion are fed from the side of the CPU in this preferred embodiment. The CPU controls also a change in the configuration of the succeeding stage circuit side, and also the protocol conversion is dynamically controlled in correspondence with this change.

Figure 13:
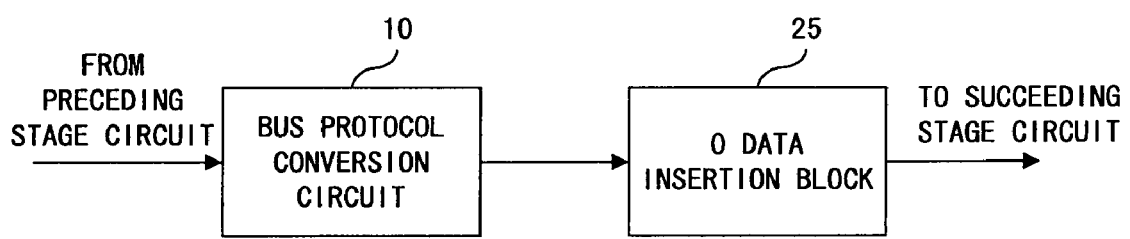
FIG. 13 is a schematic explaining a 0 data insertion method in a second embodiment.
Figure 14:
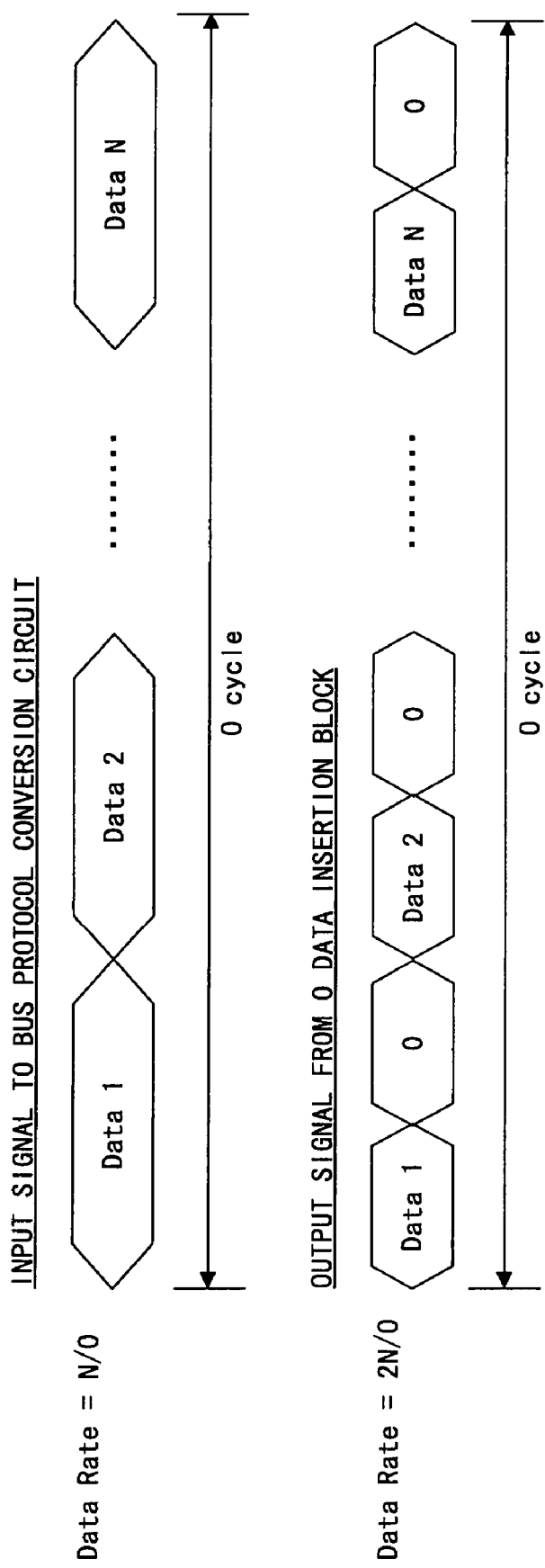
FIG. 14 is a schematic explaining a specific example of 0 data insertion.

FIGS. 13 and 14 are schematics explaining a second embodiment. This second embodiment is an embodiment for inserting "0" data at the time of data output to the succeeding stage circuit when data transfer rates are different in the preceding stage circuit and the succeeding stage circuit.

In FIG. 13, a 0 data insertion block 25 is added between the bus protocol conversion circuit 10 described with reference to FIG. 8 and the succeeding stage circuit, for example, the RCL 13 of FIG. 5, and "0" data is inserted, whereby a data transfer rate is converted.

FIG. 14 is a schematic explaining a specific example of this data transfer rate conversion. The upper schematic indicates an input signal to the bus protocol conversion circuit 10, and N pieces of data are input in a sequential form (transfer rate N/O) during an O cycles corresponding to the length of the data frame regarded by using the output side clock.

The lower schematic indicates an output signal to the succeeding stage circuit, namely, the output signal from the 0 data insertion block. "0" data is inserted respectively between input data, whereby the output signal including that data is fed to the succeeding stage circuit at a doubled data transfer rate (2N/O).

A third embodiment is described next with reference to FIGS. 15 to 17. The first and the second embodiments refer to the bus protocol conversion method as a basic method with which a protocol conversion method, namely, a mode is not switched, for instance, within 1 frame. The third embodiment assumes that mode switching is made by adding, for example, the parameter R, which indicates that mode switching is made within 1 frame, as a parameter fed from, for example, the CPU, and by inputting externally a mode signal which indicates that mode switching must be made.

Figure 15:
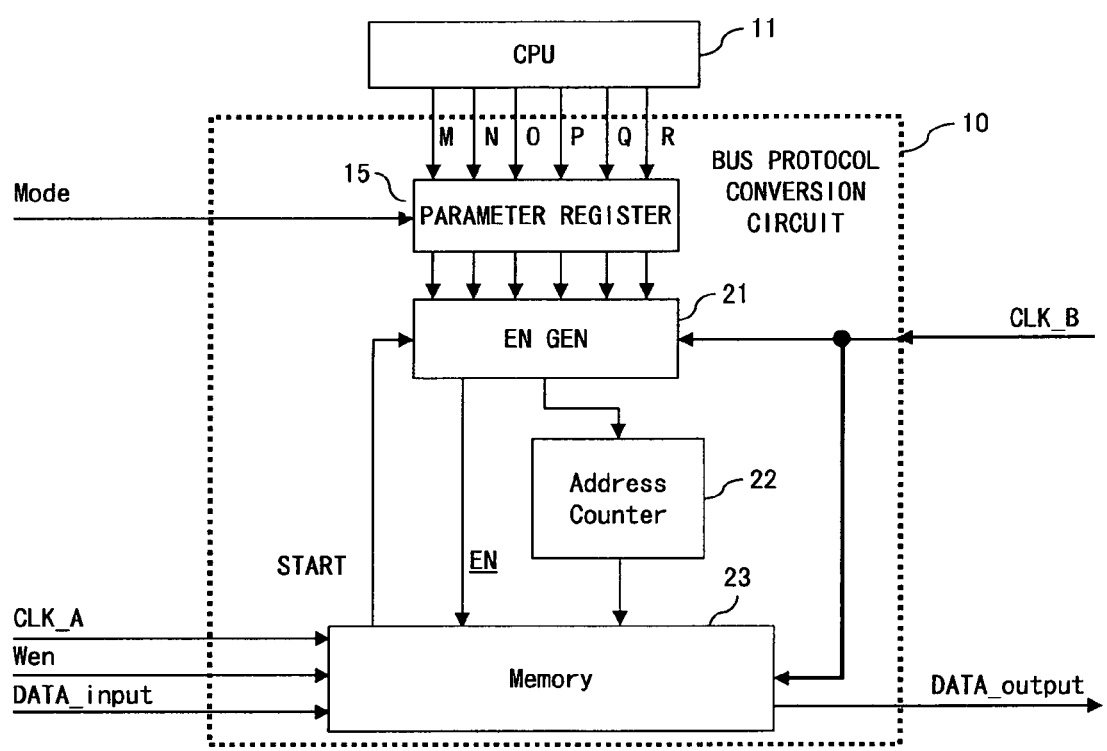
FIG. 15 is a schematic explaining a mode switching method in a third embodiment.

In FIG. 15, the parameter R is fed from the CPU 11 to the bus protocol conversion circuit 10 in addition to the above described 5 parameters, and the 6 parameters are stored in the parameter register 15. Additionally, the mode signal is fed as part of input data, for example, from the preceding stage circuit. This mode signal can be fed from the CPU 11.

Figure 16:
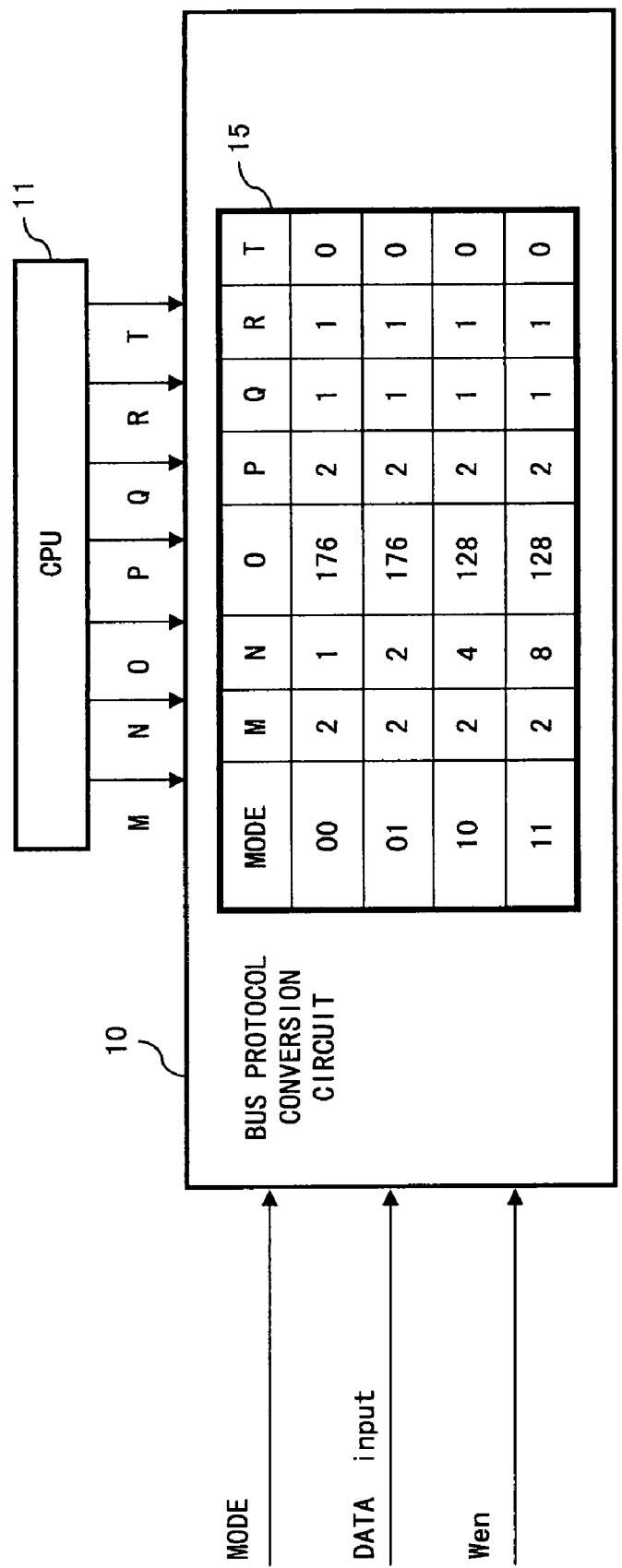
FIG. 16 shows an example of contents stored in a parameter register in the third embodiment.

FIG. 16 exemplifies contents stored in the parameter register in the third embodiment. Within the parameter register 15, the parameters R and T are stored for respective modes in addition to the above described 5 parameters for the bus protocol conversion. This parameter R indicates whether or not to change the protocol conversion mode within 1 frame, for example, the next data frame. If this value is "1", it indicates that the mode is changed within 1 frame. The parameter T will be described later.

Figure 17:
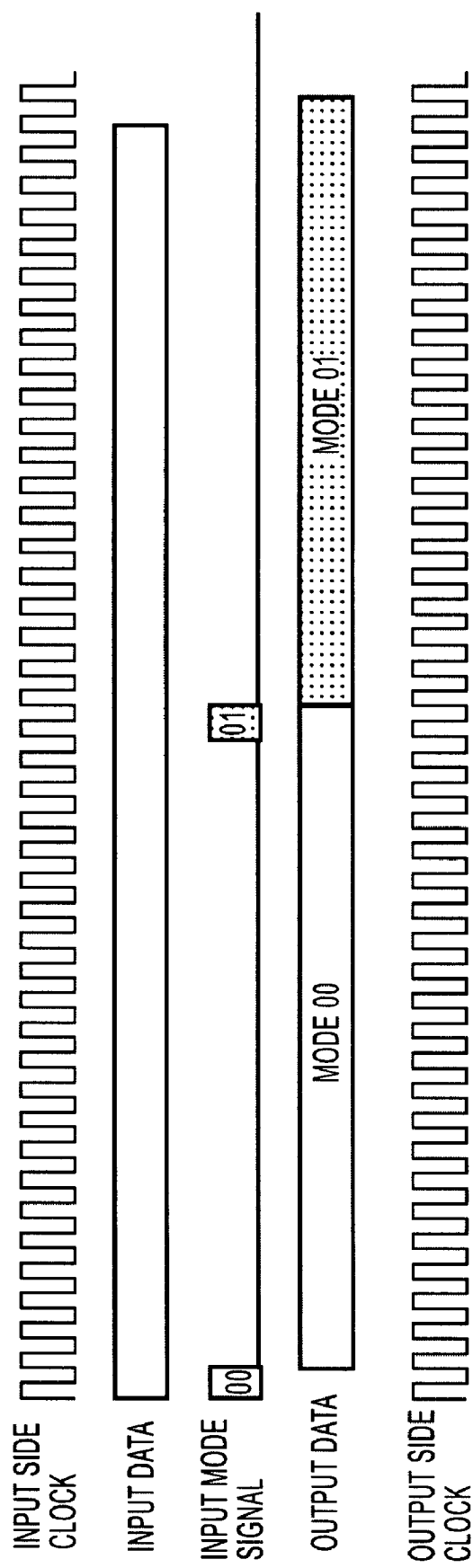
FIG. 17 is an operational time chart of mode switching.

FIG. 17 is a time chart showing an operation changing a bus protocol conversion method, namely, a mode. Initially, for example, "00" is fed as an input mode signal, and the bus protocol conversion is performed in accordance with contents stored in the parameter register 15 described with reference to FIG. 16. The parameter R for the mode "00" is "1" at this time, and a mode change is expected to be made within 1 frame, for example, the next frame, or a data frame ahead by some. Therefore, the bus protocol conversion circuit continues to monitor an input mode signal, and performs the bus protocol conversion by using the parameters specified with the mode "01" within the parameter register 15 from a time point when "01" is input as an input mode signal as shown in FIG. 17. The times during which the operations of the modes "00" and "01" are performed are the same in FIG. 17. Normally, however, the number of data frames in which the operation of the mode "00" is performed, and that in which the operation of the mode "01" is performed are different.

Figure 18:
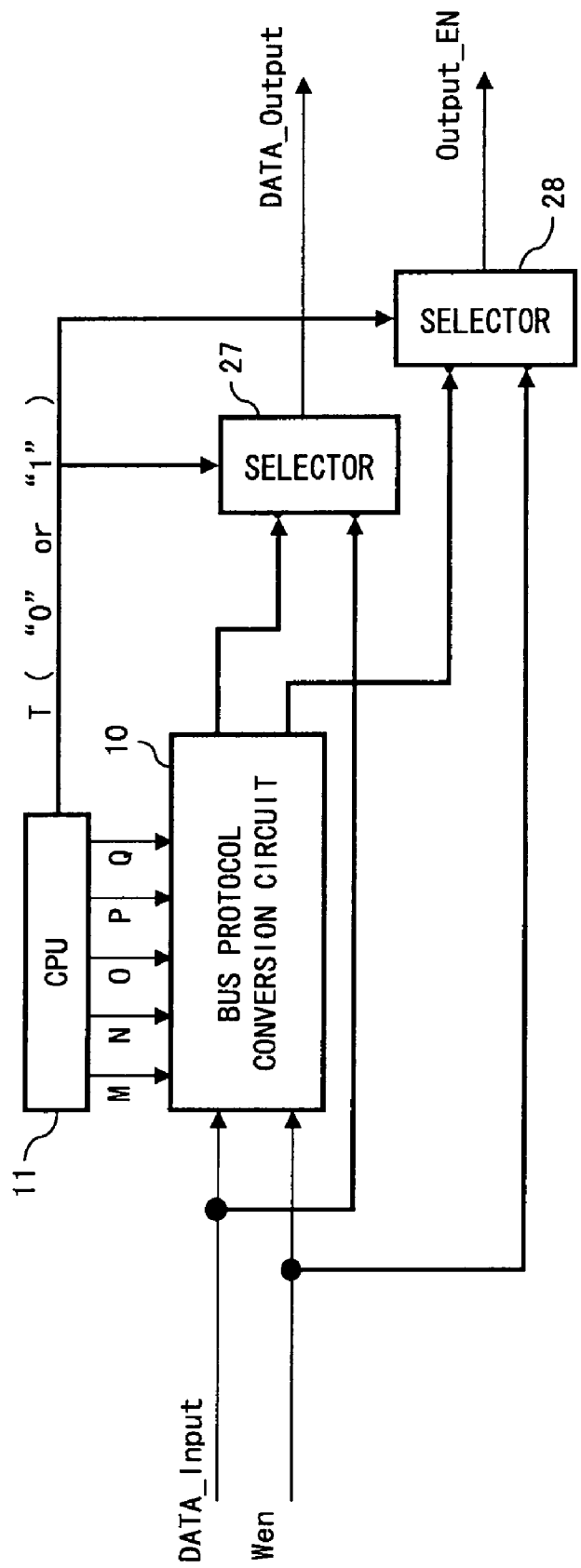
FIG. 18 is a schematic explaining a data output method where data is made to pass through in a fourth embodiment.
Figure 19:
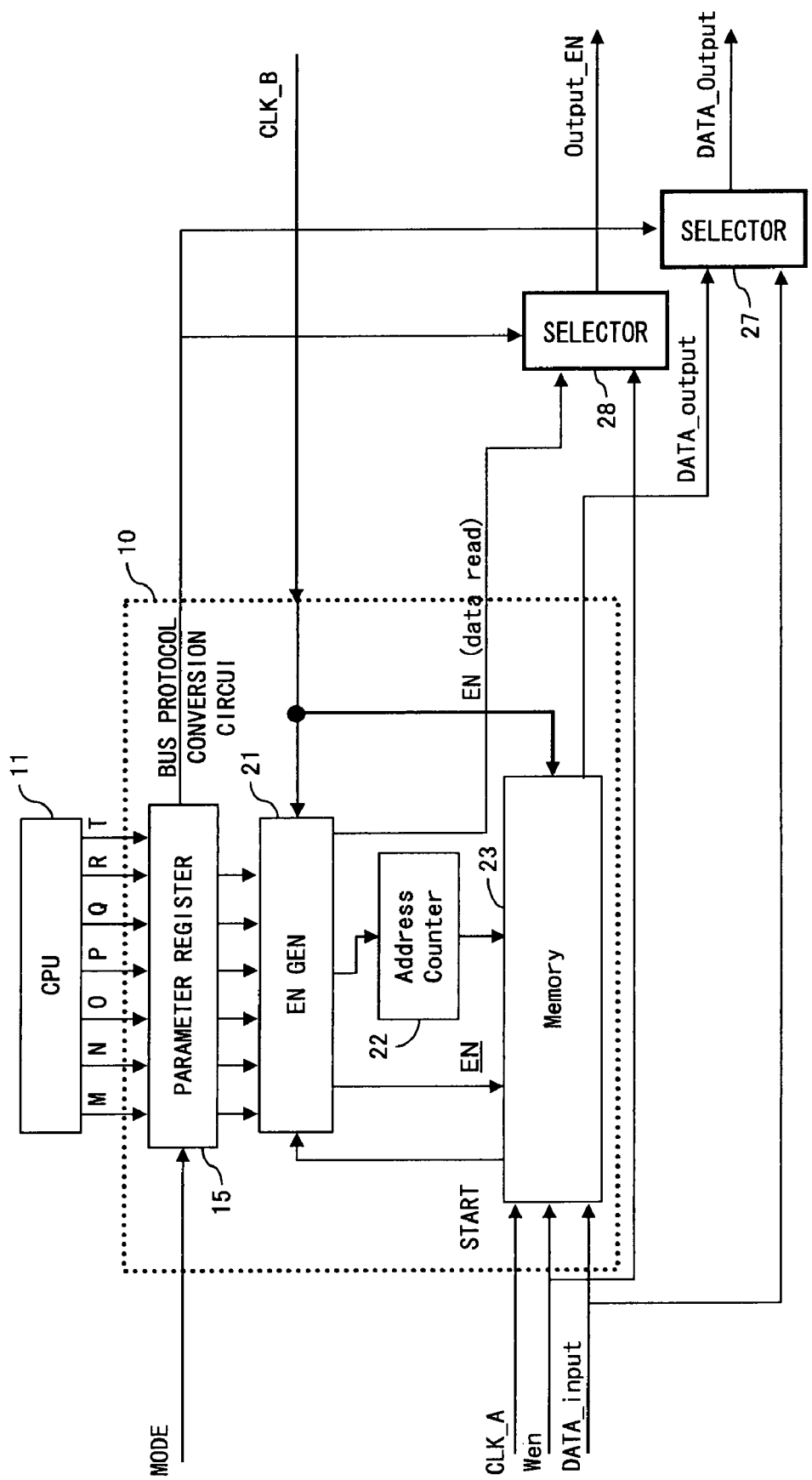
FIG. 19 is a schematic explaining the operations of a bus protocol conversion circuit in the fourth embodiment.

FIGS. 18 and 19 are schematics explaining a fourth embodiment. The fourth embodiment is an embodiment where data is made to pass through in the bus protocol conversion circuit when the protocol is not changed in the preceding stage and the succeeding stage circuits. In this fourth embodiment, whether or not to make data pass through is controlled by using the parameter T stored in the parameter register 15 in FIG. 16. If the parameter T stored in the parameter register is "1" in FIG. 18, input data is output by a selector 27 to the succeeding stage circuit unchanged as output data by being made to pass through. Also the write enable signal Wen to the memory as an input enable signal input from the preceding stage circuit is fed by a selector 28 to the succeeding stage circuit as an output enable signal. How the output enable signal is used by the succeeding stage circuit is not limited here. It is assumed that also the output enable signal when the bus protocol conversion is performed is output from the selector 28 to the succeeding stage circuit. This indicates that, for example, the lowest enable signal for data read in FIG. 9 is output to the succeeding stage circuit depending on need.

FIG. 19 is a block diagram showing a configuration including the contents of the bus protocol circuit in the fourth embodiment. In this figure, in a similar manner as in FIG. 18, input data is output by the selector 27 unchanged if the value of the parameter T is "1". Additionally, the write enable signal Wen to the memory is output by the selector 28 to the succeeding stage circuit unchanged as an output EN signal if the value of the parameter T is "1".

Figure 20:
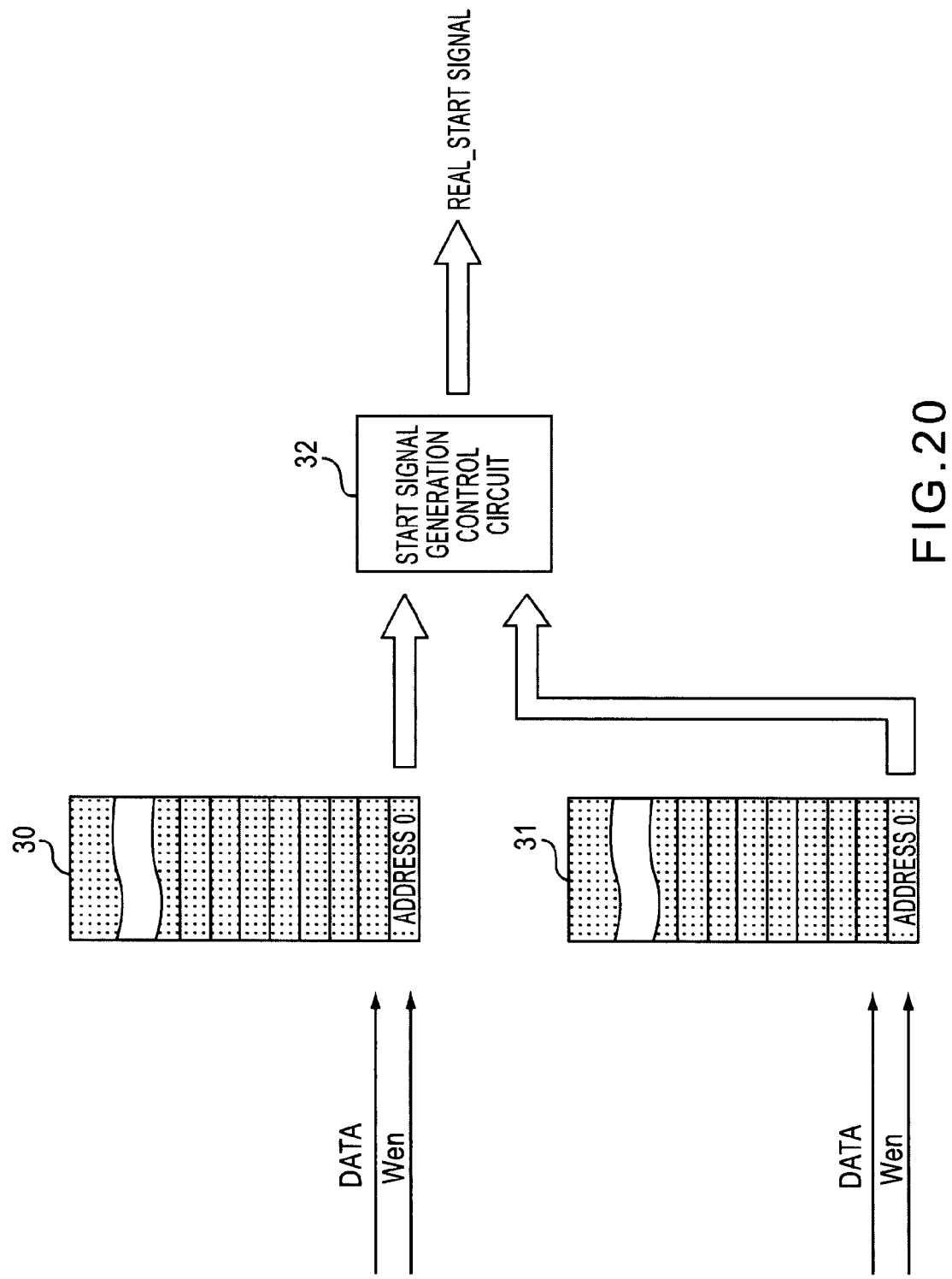
FIG. 20 is a schematic explaining a start signal generation method in a fifth embodiment.

A fifth embodiment is described next with reference to FIGS. 20 to 22. The fifth embodiment is an embodiment where latency is adjusted by adjusting, for a plurality of memories, a time from when data input is made to the memory until when the data is output. FIG. 20 is a schematic explaining a latency adjustment method for adjusting latency by generating a real start signal equivalent to the start signal described with reference to FIG. 8 at a time point when data is input to both of the address 0 of, for example, the 2 memories 30 and 31 (or 2 memory banks of dual port random access memory). In this figure, a data write is notified from the respective memories 30 and 31 to a start signal generation control circuit 32 at a time point when the data is written to the address 0. The real start signal is transmitted to an EN generator at a time point when the data is written to the address 0 of all of memories, here, both of the memories 30 and 31.

Figure 21:
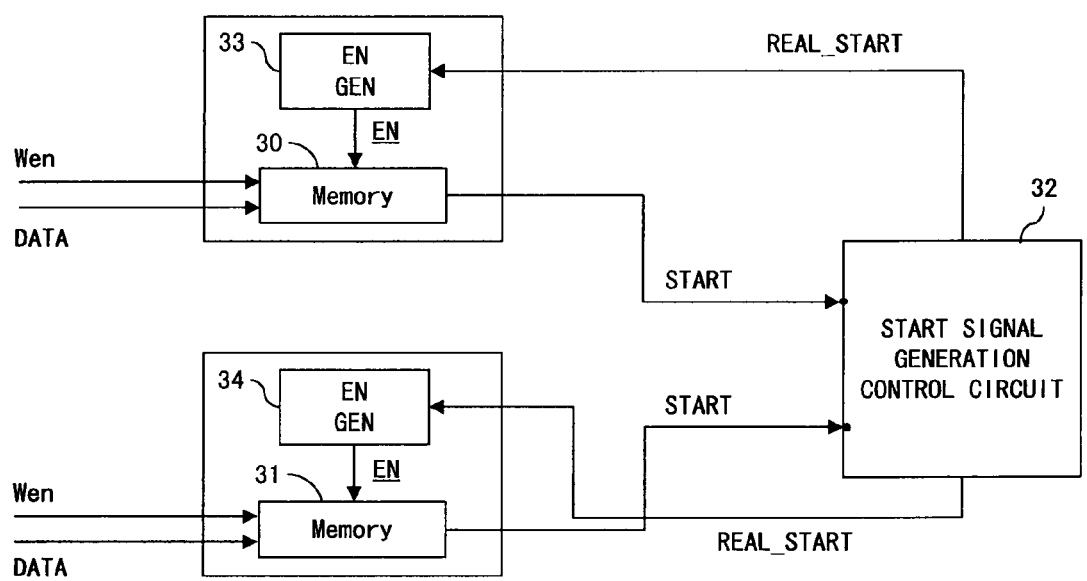
FIG. 21 is a schematic explaining a latency adjustment method (No. 1)

FIG. 21 is a schematic explaining a latency adjustment method between a plurality of circuits in a preceding stage and a plurality of circuits in a succeeding stage. In FIG. 21, it is assumed that input data is fed, for example, from the 2 circuits in the preceding stage respectively to the memories 30 and 31, and data is output respectively from the memories 30 and 31 to, for example, 2 different circuits in the succeeding stage. A start signal is fed respectively from the memories 30 and 31 to a start signal generation control circuit 32 at a time point when data is written to the address 0. A real start signal as data for specifying the initial time point of, for example, the data frame described with reference to FIG. 9 is output to EN generators 33 and 34 that are respectively comprised within the 2 bus protocol conversion circuits from the start signal generation control circuit 32 at a time point when the start signals from the 2 memories have been fed. In this circuit, the EN generators 33 and 34 can use mutually different bus protocol conversion methods, namely, modes, and can output data, the protocols of which are different, to the 2 circuits in the succeeding stage.

Figure 22:
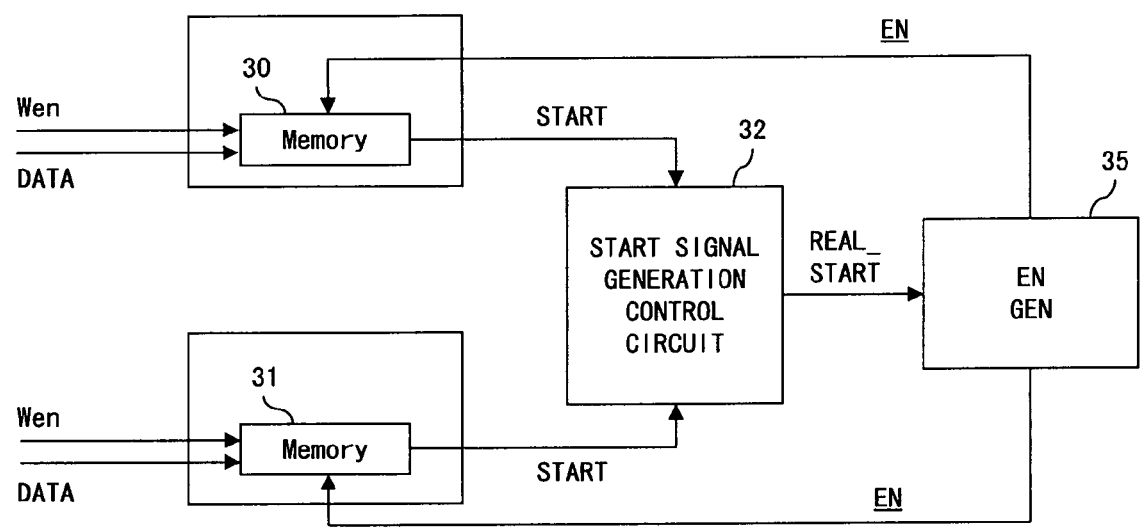
FIG. 22 is a schematic explaining a latency adjustment method (No. 2)

FIG. 22 is a schematic explaining a different latency adjustment method. Unlike FIG. 21, an EN generator 35 is shared in this figure, and the EN generator 35 feeds the same EN signal to memories 30 and 31 at a time point when a real start signal is fed from a start signal generation control circuit 32, whereby the same conversion method, namely, mode is used, and data is output respectively to the 2 circuits in the succeeding stage.

Coping with a change in the communication method using the reconfigurable circuit in this preferred embodiment is lastly described with reference to FIG. 23 which shows a configuration example of a semiconductor integrated circuit equivalent to the physical layer processing unit 106 within the software wireless device of FIG. 1.

Figure 23:
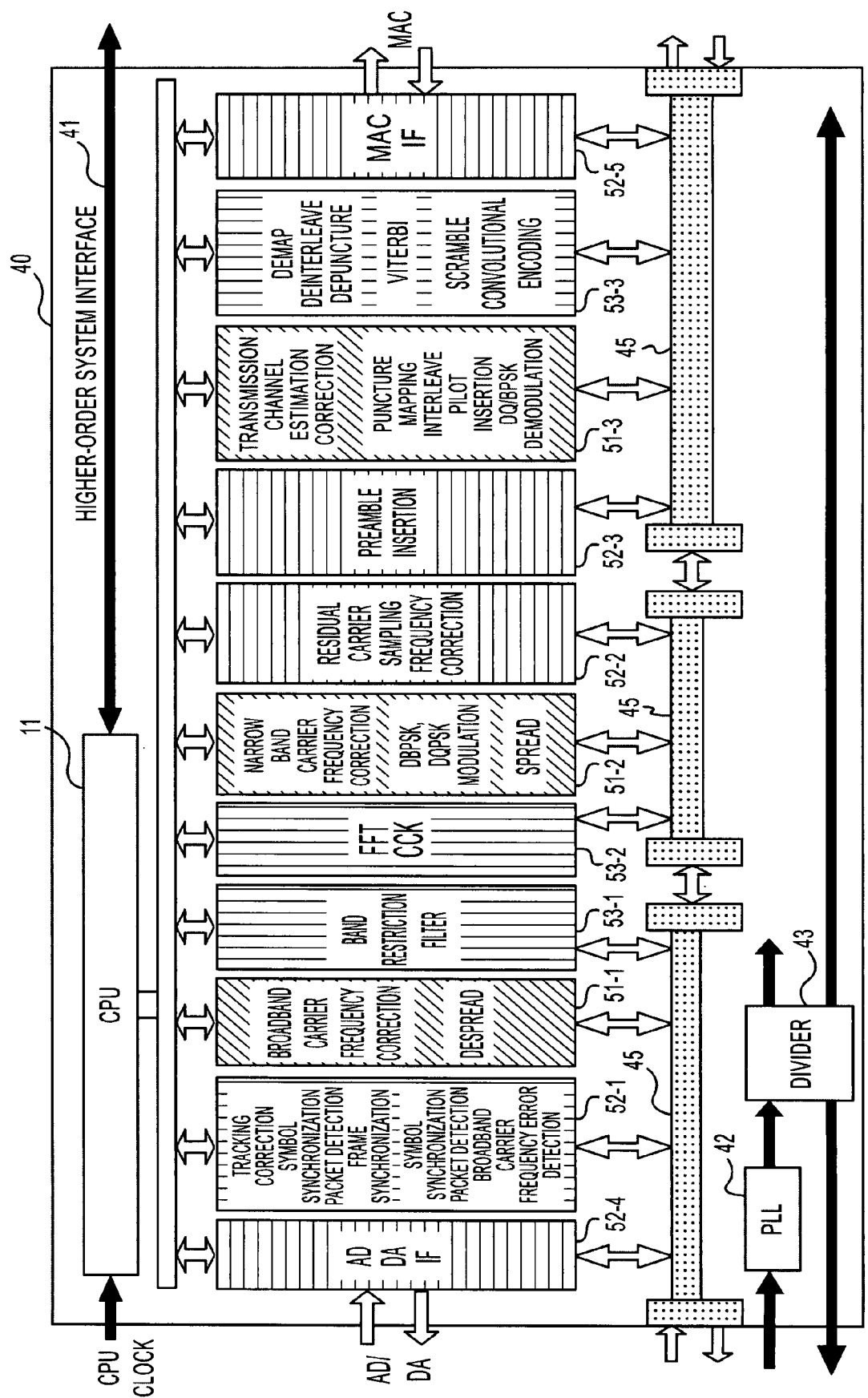
FIG. 23 shows an example of a configuration of a semiconductor integrated circuit that can support 2 communication methods.

FIG. 23 is a configuration example of the semiconductor integrated circuit that can support the specifications of 2 wireless LANs of IEEE (Institute of Electrical and Electronics Engineers) 802.11a and IEEE 802.11b by using reconfigurable circuits. In IEEE 802.11a, a 5-GHz band frequency is used, and a communication speed on the order of 20 to 50 Mbps is implemented by using an OFDM (Orthogonal Frequency Division Multiplexing) modulation method. In IEEE 802.11b, a 2.4-GHz band frequency is used, and 11-Mbps speed is obtained by using a direct sequence spread spectrum.

The semiconductor integrated circuit 40 shown in FIG. 23 includes a higher-order system interface 41. The higher-order system interface 41 provides an interface between the processor 11 and a higher-order system. Additionally, the semiconductor integrated circuit 40 includes a PLL (Phase-Locked Loop) 42 and a divider 43. The PLL 42 and the divider 43 are provided to generate an internal clock signal used by the semiconductor integrated circuit 40.

Figure 2:
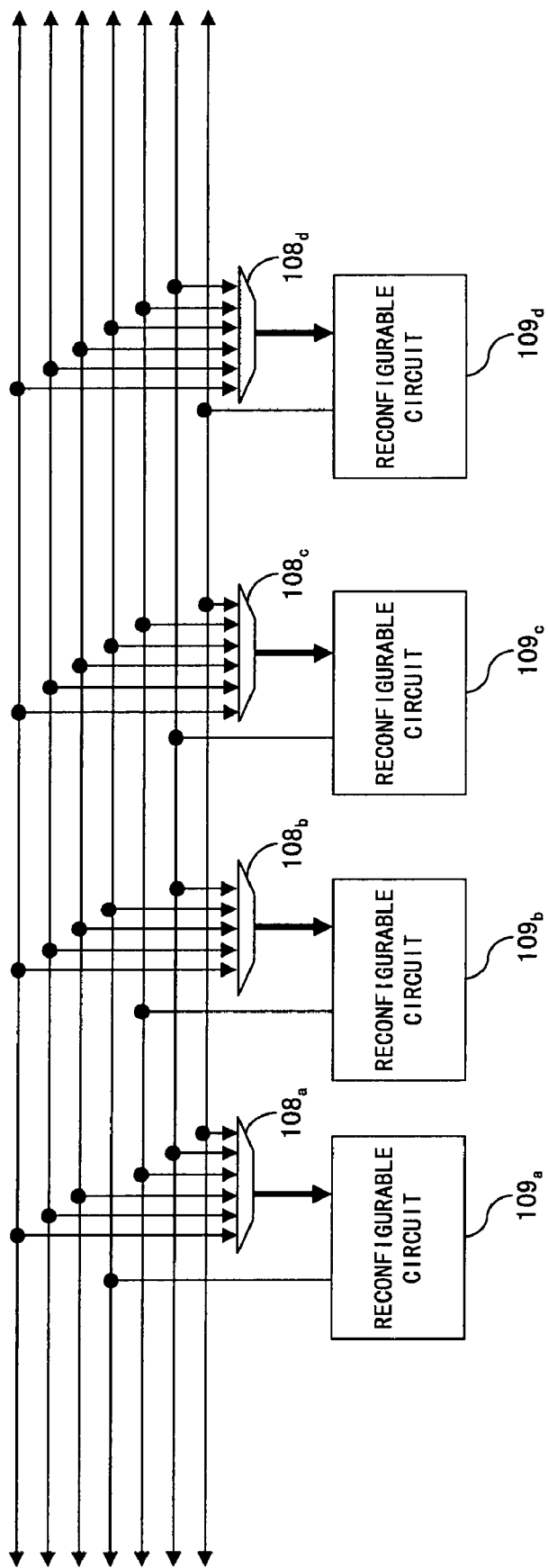
FIG. 2 is a schematic explaining a network connection within a physical layer processing unit of FIG. 1.
Figure 3:
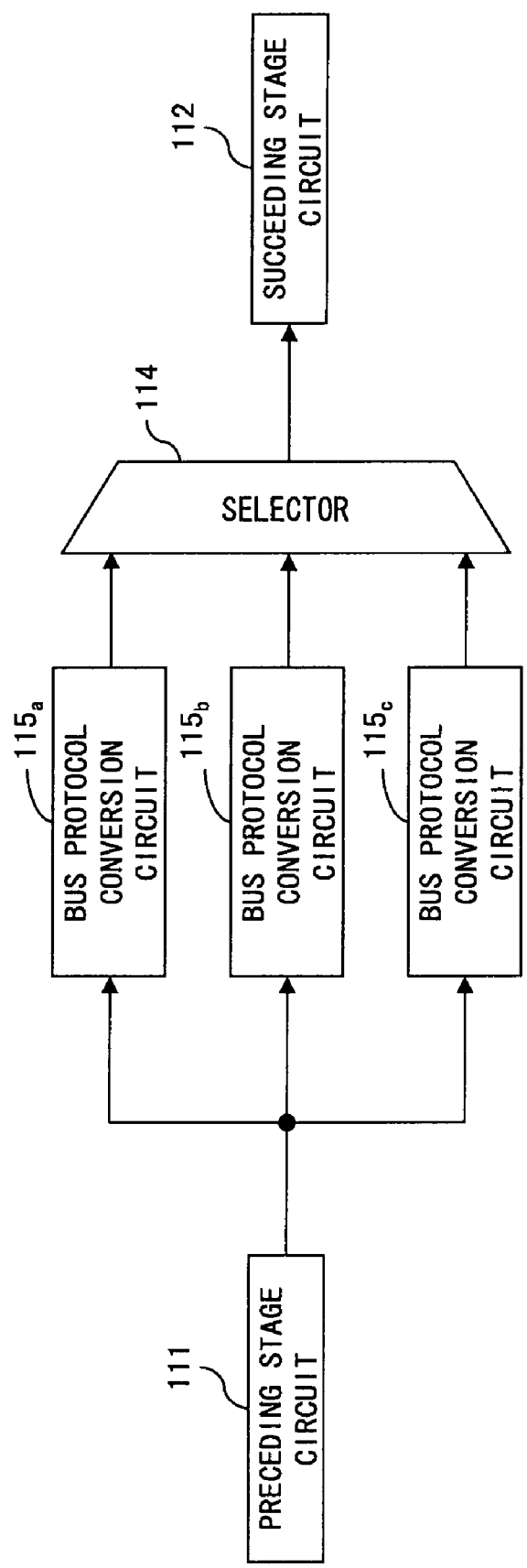
FIG. 3 is a schematic showing the configuration of a conventional example of a protocol conversion method.

3 processing sets (namely, the 3 networks 45 described with reference to FIG. 2) are provided in the semiconductor integrated circuit 40 shown in FIG. 23. Process macros 51-1 to 51-3 are (dynamic) reconfigurable circuits, process macros 52-1 to 52-5 are user logics, and process macros 53-1 to 53-3 are dedicated hardware having parameters.

In the example shown in FIG. 23, the dynamic reconfigurable circuit 51-1 implements, as a reconfigurable form, either of the functions of a broadband carrier frequency correction, which is part of the reception function of IEEE 802.11a, and the despread function, which is part of the reception function of IEEE 802.11b according to the switching between IEEE 802.11a and IEEE 802.11b. The dynamic reconfigurable circuit 51-2 implements, as a reconfigurable form, any of the function of a narrow band carrier frequency correction in the reception function of IEEE 802.11a, and the function of DBPSK (Differential BPSK)/DQPSK (Differential QPSK)/CCK (Complementary Code Keying) modulation and spread in the transmission function of IEEE 802.11b according to the switching between IEEE 802.11a and IEEE 802.11b. The dynamic reconfigurable circuit 51-3 implements, as a reconfigurable form, any of a transmission channel estimation correction in the reception function of IEEE 802.11a, and the function of puncture, interleave, mapping, and pilot insertion in the transmission function of IEEE 802.11a, and the function of DBPSK/DQPSK demodulation in the reception function of IEEE 802.11b according to the switching between IEEE 802.11a and IEEE 802.11b.

Additionally, functions such as a tracking correction/symbol synchronization/packet detection/frame synchronization, symbol synchronization packet detection, broadband carrier frequency error detection, a residual carrier sampling frequency error correction, preamble insertion, an ADC (Analog-to-Digital Converter) interface, a DAC (Digital-to-Analog Converter) interface, etc. are implemented as the user logics 52-1 to 52-5. Furthermore, functions such as a band restriction filter, FFT (Fast Fourier Transform), IFFT (Inverse FFT), CCK, demap/deinterleave/depuncture, Viterbi, scramble convolutional encoding, etc. are implemented as dedicated hardware 53-1 to 53-3 having parameters.

With the function assignment shown in FIG. 23, a function that can be processed with the dedicated hardware 53 having parameters is basically assigned to the dedicated hardware 53 having parameters. Next, a process including many heavy arithmetic operations such as a product-sum operation, etc. other than the process assigned to the dedicated hardware 53 is assigned to the dynamic reconfigurable circuit 51. The other remaining processes are assigned to the user logic 52. Basically, it is desirable to reduce the scale of the user logic 52 which is fixed and cannot be changed to a minimum, and to preferentially use a reconfigurable circuit portion such as a dynamic reconfigurable circuit 51, an FPGA, etc.

The conventional technique has problems such that the side of the preceding stage circuit must know the bus protocol of the succeeding stage circuit beforehand, and resources are wasted due to the attachment of data for conversion to the header of a frame. The conventional technique also has a problem such that a large-capacity memory for storing entire data of 1 frame including the data for conversion is required.

For example, if the side of the preceding stage circuit possesses the protocol information of the side of the succeeding stage circuit, formatting of the output can be made within the preceding stage circuit. For instance, if the reconfigurable circuit $109_a$ of FIG. 2 as the preceding stage circuit is a circuit for encoding, and the reconfigurable circuit $109_c$ as the succeeding stage circuit is a circuit for modulation, the side of the reconfigurable circuit $109_a$ in the preceding stage can format the output in order to suit the protocol of the reconfigurable circuit $109_c$ in the succeeding stage. However, there is a problem that if the resources of a reconfigurable circuit are used for such output formatting, the performance of the reconfigurable circuit significantly degrades.

A proposition of the embodiment is to provide a bus protocol conversion circuit that can individually cope with a dynamic change in a circuit configuration corresponding to a change in a communication method on the side of a succeeding stage circuit, in consideration of the above described problems.

In the embodiment, a protocol conversion circuit performing a protocol conversion, for example, a conversion for a bus protocol or a communication protocol, between a preceding stage circuit and a succeeding stage circuit comprises a data storing unit, an output enable signal generating unit, and an address specifying unit.

The data storing unit stores input data from the preceding stage circuit. The output enable signal generating unit generates an output enable signal for outputting data stored in the data storing unit to the succeeding stage circuit by using one or more parameters for the protocol conversion which are externally fed and can take a different value each time interval externally specified. The address specifying unit feeds the address for read of an output data to the data storing unit based on the output enable signal.

According to another aspect of the embodiment, a protocol conversion circuit performs a protocol conversion between 2 preceding stage circuits and 2 succeeding stage circuits respectively corresponding to the preceding stage circuits, and comprises 2 data storing units, a start signal generating unit, and an output enable signal generating unit.

The 2 data storing units respectively store input data from the 2 preceding stage circuits. The start signal generating unit receives a start signal output from each of the data storing units at a time point when initial data is stored in each of the data storing units for each time interval externally specified, and outputs a real start signal upon receipt of the start signals from both of the 2 data storing units. The output enable signal generating unit generates an output enable signal by using one or more parameters for a protocol conversion which are externally fed and can take a different value for each specified time interval described above, and feeds the generated output enable signal to each of the data storing units. The output enable signal is a signal for outputting data stored in the data storing unit to the succeeding stage circuit and is delayed by a predetermined number of clocks, the predetermined number being specified by one of the one or more parameters, from the input time point of the real start signal.

According to another aspect of the embodiment, a protocol conversion circuit performs a protocol conversion between 2 preceding stage circuits and 2 succeeding stage circuits in a similar manner, and comprises the above described 2 data storing units, the above described start signal generating unit, and 2 output enable signal generating units feeding the 2 data storing units respectively with mutually independent output enable signals for outputting data stored in the 2 data storing units to corresponding succeeding stage circuits. The output enable signals are delayed by a predetermined number of clocks, the predetermined number being specified by one of the one or more parameters described above, from the input time point of a real start signal in a similar manner as in the above description. The output enable signals are generated by using the one or more parameters which are externally fed as parameters for the protocol conversion for data stored in the 2 data storing units and can take a value different for each specified time interval described above.

As described above, according to the embodiment, a protocol conversion is performed between a preceding stage circuit and a succeeding stage circuit by using parameters for a data transfer, which are fed externally, for example, from a central processing unit that controls the whole of a software wireless device.

What is claimed is:

1. A protocol conversion circuit performing a protocol conversion between a preceding stage circuit and a reconfigurable circuit provided in a succeeding stage, comprising:
   a data storing unit to store input data from the preceding stage circuit;
   an output enable signal generating unit to generate an output enable signal for outputting data stored in the data storing unit to the reconfigurable circuit on a basis of configuration information of the reconfigurable circuit;
   an address specifying unit to specify an address for read of an output data for the data storing unit based on the output enable signal; and
   a start signal generating unit to output a start signal to the output enable signal generating unit at a time point when storing of an initial input data is started for a time interval externally specified in the data storing unit, wherein
   the output enable signal generating unit generates an output enable signal which is delayed, by a number of clocks specified with a parameter, from an input time point of the start signal.

2. The protocol conversion circuit according to claim 1, wherein
   the protocol conversion circuit is comprised in a software wireless device; and
   one or more parameters for the protocol conversion are fed from a central processing unit that controls a whole of the software wireless device.

3. The protocol conversion circuit according to claim 1, wherein
   the protocol conversion circuit is comprised in a software wireless device; and
   one or more parameters for the protocol conversion are fed from a side of the succeeding stage, wherein the succeeding stage is within the software wireless device.

4. The protocol conversion circuit according to claim 1, wherein
   a time interval at which the configuration information can change is externally specified.

5. The protocol conversion circuit according to claim 1, further comprising
   a parameter register storing one or more parameters for the protocol conversion in correspondence with a protocol conversion mode, wherein
   the output enable signal generating unit generates an output enable signal based on contents stored in the parameter register in correspondence with a change in an externally fed protocol conversion mode signal.

6. The protocol conversion circuit according to claim 1 wherein
   a 0 data inserting unit inserting "0" as data between data output from the data storing unit is provided in a succeeding stage of the protocol conversion circuit.

7. The protocol conversion circuit according to claim 1, wherein:
   a specific parameter indicating whether or not to perform the protocol conversion is fed to the protocol conversion circuit; and
   the protocol conversion circuit further comprises a data passing-through unit outputting data input from the preceding stage circuit unchanged to the reconfigurable circuit when the specific parameter indicates not to perform the protocol conversion.

8. A protocol conversion circuit, which is a circuit performing a protocol conversion between a plurality of preceding stage circuits and a plurality of reconfigurable circuits provided in a succeeding stage corresponding to the respective preceding stage circuits, comprising:
   a plurality of data storing units respectively storing input data from the plurality of preceding stage circuits;
   a start signal generating unit receiving a start signal output from each of the data storing units at a time point when storing of initial data is started for each time interval externally specified in the plurality of data storing units, and outputting a real start signal upon receipt of the start signals from all of the plurality of data storing units; and
   an output enable signal generating unit generating an output enable signal on a basis of configuration information of the plurality of reconfigurable circuits and feeding the generated output enable signal to each of the data storing units, wherein
   the output enable signal is a signal for outputting data stored in each of the data storing units to the plurality of reconfigurable circuits, is shared by the plurality of data storing units, and is delayed, by a predetermined number of clocks specified by the configuration information, from an input time point of the real start signal.

9. A protocol conversion circuit, which is a circuit for performing a protocol conversion between a plurality of preceding stage circuits and a plurality of reconfigurable circuits provided in a succeeding stage corresponding to the respective preceding stage circuits, comprising:

a plurality of data storing units for respectively storing input data from the plurality of preceding stage circuits;

a start signal generating unit receiving a start signal output from each of the data storing units at a time point when storing of initial data is started for each time interval externally specified in the plurality of data storing units, and outputting a real start signal upon receipt of the start signals from all of the plurality of data storing units; and a plurality of output enable signal generating units generating an output enable signal on a basis of configuration information of the plurality of reconfigurable circuits and feeding the generated output enable signal to each of the data storing units, wherein the output enable signal is a signal for outputting data stored in each of the data storing units to the plurality of reconfigurable circuits, is an independent output enable signal for each of the plurality of data storing units, and is delayed, by a predetermined number of clocks specified by the configuration information, from an input time point of the real start signal.

10. The protocol conversion circuit according to claim 1, wherein the configuration information comprises a parameter for the protocol conversion fed from the reconfigurable circuit or fed from a central processing unit controlling a configuration of the reconfigurable circuit.

11. The protocol conversion circuit according to claim 8, wherein the configuration information comprises a parameter for the protocol conversion fed from the plurality of reconfigurable circuits or fed from a central processing unit controlling configurations of the plurality of reconfigurable circuits.

12. The protocol conversion circuit according to claim 9, wherein the configuration information comprises a parameter for the protocol conversion fed from the plurality of reconfigurable circuits or fed from a central processing unit controlling configurations of the plurality of reconfigurable circuits.

* * * * *